(12) United States Patent
Li et al.

(10) Patent No.: US 10,946,820 B2
(45) Date of Patent: Mar. 16, 2021

(54) IN-VEHICLE DETECTION SYSTEM AND POWER SUPPLY SYSTEM AND POWER SUPPLY CONTROLLER

(71) Applicants: NUCTECH COMPANY LIMITED, Beijing (CN); Tsinghua University, Beijing (CN)

(72) Inventors: Jianmin Li, Beijing (CN); Hao Yu, Beijing (CN); Zhiqiang Chen, Beijing (CN); Yuanjing Li, Beijing (CN); Yulan Li, Beijing (CN); Li Zhang, Beijing (CN); Jingyu Gu, Beijing (CN); Dongyu Wang, Beijing (CN)

(*) Notice: Subject to any disclaimer, the term of this patent is extended or adjusted under 35 U.S.C. 154(b) by 869 days.

(21) Appl. No.: 15/609,013

(22) Filed: May 31, 2017

(65) Prior Publication Data
US 2018/0022301 A1   Jan. 25, 2018

(30) Foreign Application Priority Data
Jul. 22, 2016 (CN) .................. 201610582807.X

(51) Int. Cl.
| B60R 16/033 | (2006.01) |
| H02J 3/14 | (2006.01) |
| H01M 10/052 | (2010.01) |
| H01M 10/42 | (2006.01) |
| H02J 7/00 | (2006.01) |

(52) U.S. Cl.
CPC ......... B60R 16/033 (2013.01); H01M 10/052 (2013.01); H01M 10/4207 (2013.01); H02J 3/14 (2013.01); H02J 7/0021 (2013.01); Y02B 70/3225 (2013.01); Y04S 20/222 (2013.01)

(58) Field of Classification Search
CPC ................ B60R 16/00; H02J 3/00; H02J 7/00
See application file for complete search history.

(56) References Cited

U.S. PATENT DOCUMENTS

| 5,162,720 A | 11/1992 | Lambert |
| 2002/0136353 A1 | 9/2002 | Kang et al. |

(Continued)

FOREIGN PATENT DOCUMENTS

| CN | 1490616 A | 4/2004 |
| CN | 101027576 A | 8/2007 |

(Continued)

OTHER PUBLICATIONS

IP Office Search Report dated Nov. 22, 2017 corresponding to Application No. GB 1708278.5.

(Continued)

*Primary Examiner* — Daniel J Cavallari
*Assistant Examiner* — Joseph N Inge
(74) *Attorney, Agent, or Firm* — Kilpatrick Townsend & Stockton, LLP

(57) ABSTRACT

The present disclosure discloses an in-vehicle detection system and power supply system and power supply controller, which relates to the power supply control field. The power supply system comprises a low-power generator; a battery pack for supplying power to the in-vehicle detection system; a charger electrically connected to the low-power generator and the battery pack, respectively; and a power supply controller electrically connected to the battery pack and the low-power generator, respectively.

18 Claims, 7 Drawing Sheets

(56) References Cited

U.S. PATENT DOCUMENTS

| | | | | |
|---|---|---|---|---|
| 2004/0199297 | A1* | 10/2004 | Schaper | H02J 7/1461 700/287 |
| 2008/0112537 | A1* | 5/2008 | Katcha | A61B 6/56 378/102 |
| 2008/0122195 | A1* | 5/2008 | Beeson | B60P 3/14 280/151 |
| 2009/0096285 | A1 | 4/2009 | Acena et al. | |
| 2010/0289336 | A1 | 11/2010 | Sugita | |
| 2010/0294579 | A1 | 11/2010 | Chen | |
| 2012/0132814 | A1 | 5/2012 | Weinberg | |
| 2013/0110339 | A1 | 5/2013 | Akimasa | |
| 2015/0246649 | A1* | 9/2015 | Brunbauer | H02K 7/1815 307/9.1 |
| 2015/0325401 | A1 | 11/2015 | Langeveld et al. | |

FOREIGN PATENT DOCUMENTS

| | | |
|---|---|---|
| CN | 11572428 A | 11/2009 |
| CN | 104445981 A | 3/2015 |
| CN | 104459813 A | 3/2015 |
| CN | 104578263 A | 4/2015 |
| CN | 104578294 A | 4/2015 |
| CN | 104853946 A | 8/2015 |
| CN | 105445294 A | 3/2016 |
| CN | 105784737 A | 7/2016 |
| CN | 106230088 A | 12/2016 |
| CN | 205945195 U | 2/2017 |
| EP | 2216876 A1 | 8/2010 |
| EP | 2886387 A2 | 6/2015 |
| EP | 2993495 A1 | 3/2016 |
| JP | 2012196028 A | 10/2012 |
| JP | 2013110944 A | 6/2013 |
| RU | 2 239 821 C2 | 2/2004 |
| WO | 9617260 A1 | 6/1996 |
| WO | 2006/036076 A1 | 4/2006 |
| WO | 2006036076 A1 | 4/2006 |

OTHER PUBLICATIONS

Min Duan, "EV Technology", pp. 124-131, Sep. 1, 2015, total 8 pages.

Translation of Office Action and Search Report from the Russian Federation for Application No. 2017118549/11 for search completed on Nov. 14, 2019, 4 pages.

Office Action for EP Application No. 17172655.7 dated Dec. 4, 2019, 11 pages.

European Search Report dated Jan. 17, 2018 in the corresponding European application (application No. 17172655.7).

\* cited by examiner

IN-VEHICLE DETECTION SYSTEM AND POWER SUPPLY SYSTEM AND POWER SUPPLY CONTROLLER

TECHNICAL FIELD

The present disclosure relates to power supply control field, especially an in-vehicle detection system and power supply system and power supply controller.

BACKGROUND

An in-vehicle mobile container detection system can travel freely to different places for detection. However, the places being detected usually do not have a fixed power supply. Therefore, the in-vehicle mobile container detection system needs a mobile power supply of its own. At present, actual products at home or abroad mostly use a high power diesel generator as the mobile power supply.

There are the following disadvantages by using the prior art:

1. There are many electric equipments in the in-vehicle container detection system, and a peak electric power may reach above 30 kW, but an average power is below 10 kW, and the average power of a whole day is even less during discontinuous work. However, a rated power of the generator needs to be greater than the peak power, whereas a high-power generator is very heavy, which is very unfavorable to the lightweight design of the container detection system. On the other hand, an output power of the generator in most of the time is far less than the rated power, which results in waste.

2. The vibration of the high-power generator in operation is strong, and the vibration will be conducted to an accelerator compartment, which influences a dose stability of the X-ray beam flow generated by the accelerator, thereby influencing the imaging quality.

3. The noisy of the high-power generator in operation is loud, which influences an experience of the operating staff in the working compartment near the generator.

SUMMARY

The present disclosure aims to solve a technical problem of providing a power supply system, a power supply controller of an in-vehicle detection system, which can improve the power supply efficiency of the system.

In addition, the present disclosure further aims to solve a technical problem of reducing vibrations and noises of the in-vehicle detection system which is running.

According to one aspect of the present disclosure, a power supply system for an in-vehicle detection system is provided, comprising: a low-power generator; a battery pack for supplying power to the in-vehicle detection system; a charger electrically connected to the low-power generator and the battery pack, respectively; and a power supply controller electrically connected to the battery pack and the low-power generator, respectively.

Further, the power supply system further comprises: a power supply selector electrically connected to the charger, the power supply controller and the low-power generator, respectively, for making a selection between an external power supply and the low-power generator; or a second charger electrically connected to the battery pack, for charging the battery pack from an external power supply.

Further, the battery pack is a lithium battery pack, and the lithium battery pack comprising: at least one battery set formed of a plurality of lithium battery cells connected in series or in parallel; and a battery management system for monitoring an electric quantity state of the battery set, and sending electric quantity state information to the power supply controller.

Further, the power supply system further comprises: a DC-DC converter electrically connected to the lithium battery pack, for converting a high voltage DC output from the lithium battery pack into a low voltage DC; and/or a DC-AC converter electrically connected to the lithium battery pack, for converting a high voltage DC output from the lithium battery pack into an power frequency AC.

Further, the battery pack further comprises an energy feedback unit for receiving electric energy fed back by the in-vehicle detection system.

According to another aspect of the present invention, a power supply controller is further provided, comprising: an electric quantity state receiving unit for receiving electric quantity state information sent by the battery pack; a determining unit for determining whether the electric quantity state satisfies the working requirement of the in-vehicle detection system based on the electric quantity state information; and a control unit for sending a start instruction to the low-power generator to charge the battery pack if the electric quantity state does not satisfy the working requirement of the in-vehicle detection system.

Further, the power supply controller further comprises: an external power supply detection unit for detecting whether there is an external power supply, wherein, the control unit is further used for controlling the external power supply to charge the battery pack if the external power supply is detected by the external power supply detection unit.

Further, the control unit is further used for: sending a start instruction to the low-power generator if the external power supply is not detected by the external power supply detection unit, and sending a stop instruction to the low-power generator if the electric quantity state information received by the electric quantity state receiving unit represents that the electric quantity of the battery pack is in full state.

Further, the power supply controller further comprises: a working state receiving unit for receiving a working state of the in-vehicle detection system, wherein the working state includes a scanning state, a standby state or a stopped state, wherein, the determining unit is further used for determining a timing for starting or stopping the low-power generator based on the electric quantity state information and the working state of the in-vehicle detection system, and the control unit is further used for sending a start/stop instruction to the low-power generator according to the determination result of the determining unit.

Further, the power supply controller further comprises: a power consumption acquisition unit for acquiring power consumption per unit time in each working state of the in-vehicle detection system; and a workload state acquisition unit for acquiring a workload state of the in-vehicle detection system, wherein the workload state is determined based on a proportion of working periods of the in-vehicle detection system in each of different working states, wherein, the determining unit is further used for predicting whether the remaining electric quantity of the battery pack satisfies the working requirement of the in-vehicle detection system according to the working state, workload state and power consumption per unit time in each working state of the in-vehicle detection system, and the control unit is further used for sending a start instruction to the low-power generator if the remaining electric quantity of the battery pack does not satisfy the working requirement of the in-vehicle detection system; and sending a stop instruction to the low-power generator if the remaining electric quantity of the battery pack satisfies the working requirement of the in-vehicle detection system.

Further, the power supply controller further comprises: a parameter receiving unit for receiving configuration parameters and current time, wherein, the determining unit is further used for predicting average power consumption per unit time during a future period of time according to the workload state and the power consumption per unit time in each working state of the in-vehicle detection system and predicting whether the remaining electric quantity of the battery pack satisfies the working requirement of the in-vehicle detection system according to the configuration parameters, the current time, the working state, the predicted average power consumption per unit time and the remaining electric quantity of the battery pack.

Further, the determining unit is further used for determining whether the remaining electric quantity of the battery pack is greater than a threshold, and whether the in-vehicle detection system is in an enter-scanning state or an exit-scanning state; and the control unit is further used for sending a stop instruction to the low-power generator if the remaining electric quantity of the battery pack is greater than the threshold and the in-vehicle detection system is in the enter-scanning state, and sending a start instruction to the low-power generator if the in-vehicle detection system is in the exit-scanning state.

Further, the determining unit is further used for determining whether the remaining electric quantity of the battery pack is greater than a threshold and whether an accelerator starts to emit rays; and the control unit is further used for sending a stop instruction to the low-power generator if the remaining electric quantity of the battery pack is greater than a threshold and the accelerator starts to emit rays, and sending a start instruction to the low-power generator if the accelerator finishes emitting rays.

Further, the determining unit is further used for determining a workload of the in-vehicle detection system and determining whether the remaining electric quantity of the battery pack is greater than the threshold; and the control unit is further used for sending a stop instruction to the low-power generator if the in-vehicle detection system is in a low workload state and the remaining electric quantity of the battery pack is greater than the threshold, sending an intermittent start instruction to the low-power generator if the in-vehicle detection system is in a middle workload state and the remaining electric quantity of the battery pack is greater than the threshold, and sending a start instruction to the low-power generator if the in-vehicle detection system is in a high workload state.

According to another aspect of the present invention, an in-vehicle detection system is further provided, comprising a power supply system, wherein, the power supply system comprises: a low-power generator; a battery pack for supplying power to the in-vehicle detection system; a charger electrically connected to the low-power generator and the battery pack, respectively; and a power supply controller electrically connected to the battery pack and the low-power generator, respectively.

Further, the power supply controller comprises: an electric quantity state receiving unit for receiving electric quantity state information sent by the battery pack; a determining unit for determining if the electric quantity state satisfies the working requirement of the in-vehicle detection system based on the electric quantity state information; and a control unit for sending a start instruction to the low-power generator to charge the battery pack if the electric quantity state does not satisfy the working requirement of the in-vehicle detection system.

Further, the in-vehicle detection system further comprises: a main controller for sending a control instruction to the power supply controller of the power supply system such that the power supply controller charges the battery pack according to the control instruction.

Compared with the prior art, the power supply system for an in-vehicle detection system of the present disclosure comprises a low-power generator and a battery pack. The power supply controller sends a start/stop instruction to the low-power generator according to the electric quantity state information sent by the battery pack to control the low-power generator to charge the battery pack through the charger. A low-power generator and a battery pack are used to substitute a high-power generator, which not only can reduce the requirement on a peak power of the generator by the in-vehicle detection system, and improve the efficiency of the power supply, and but also is favorable to the lightweight design of the in-vehicle detection system, and meanwhile reduces noises and vibration, and is favorable to improving the user experience and performance metrics.

Other features and advantages of the present disclosure will become clear through detailed descriptions of the illustrative embodiments of the present disclosure with reference to the following drawings.

BRIEF DESCRIPTION OF THE DRAWINGS

The drawings that form a part of the description describe the embodiments of the present disclosure, and are used to explain the theory of the present disclosure together with the description.

The present disclosure can be comprehended more clearly with reference to the drawings and according to the following detailed descriptions, wherein.

DETAILED DESCRIPTION

Figure 1:
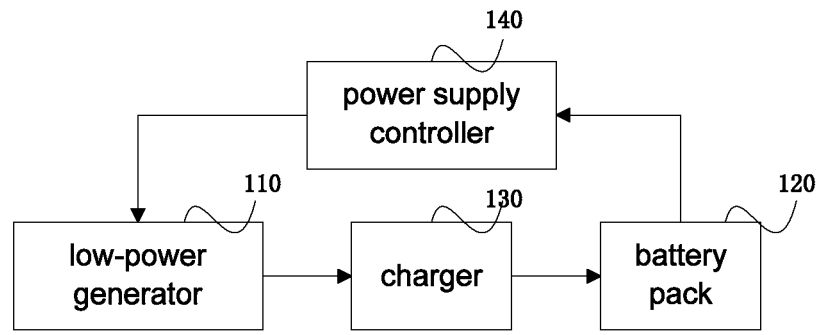
FIG. 1 is a schematic diagram of one embodiment of a power supply system for an in-vehicle detection system of the present disclosure.

Various illustrative embodiments of the present disclosure will now be described in details with reference to the drawings. It should be noted that unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

The following descriptions on at least one illustrative embodiment are actually illustrative, but shall not be any limitation on the present disclosure or its application or use.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative. Hence, other embodiments of the illustrative embodiments may have different values.

It shall be noted that similar marks and characters represent similar items in the following figures, so once a certain item is defined in one figure, no further discussion on it is required in the following figures.

To make the object, technical solutions and advantages of the present disclosure clearer, the present disclosure is further explained in details by combining specific embodiments and referring to the drawings.

FIG. 1 is a schematic diagram of one embodiment of a power supply system for an in-vehicle detection system of the present disclosure. The power supply system comprises a low-power generator 110, a battery pack 120, a charger 130 and a power supply controller 140. The charger 130 is electrically connected to the low-power generator 110 and the battery pack 120, respectively, and the power supply controller 140 is electrically connected to the battery pack 120 and the low-power generator 130, respectively.

A power of the low-power generator 110 may be lower than a peak power of the in-vehicle detection system. In an embodiment, a power of the low-power generator 110 is close to an average power of the in-vehicle detection system. The low-power generator is typically a 2 kW-10 kW gasoline or diesel generator, and may also be a vehicle-mounted force taking power generator, or wind power generation device, or a solar power generation device, and may also be a combination of the generators, wherein the power being generated is 220V single-phase power or 380V three-phase power.

The battery pack 120 is used or supplying power to the in-vehicle detection system, for example, supplying power to the electric equipments of the in-vehicle container detection system. In one embodiment, the battery pack 120 may be a high voltage lithium battery pack comprising at least one battery set which is formed of a plurality of lithium cells connected in series or in parallel, and a total voltage is generally 100V~500V, and a total capacity is generally 5 kWh~80 kWh. The high voltage lithium battery pack comprises a battery management system, which can monitor states like a voltage, electric quantity and etc. of the battery, and send the electric quantity state information to the power supply controller 140. Since the high voltage lithium battery pack has a light weight, a large capacity, and a high output current, it can satisfy the line demand of the electric equipment and the overall quality demand of the equipment. In another embodiment, the battery pack 120 may be a storage battery of the hybrid car if the in-vehicle detection system is located on a hybrid car, which can make full use of the power storage capacity of the detection system itself. The battery pack 120 further comprises an energy feedback unit, and the battery pack 120 may use energy being fed back for charging if the electric equipment of the in-vehicle detection system has a braking energy feedback function, which satisfies the requirement of energy conservation and emission reduction.

The charger 130 is typically a car charger for a pure electric car, and is used for charging the battery pack 120. The input voltage is generally a 220V single-phase voltage or a 380V three-phase voltage, the charging power is generally 2 kW~10 kW, and the maximum charging power generally has two specifications, namely, 3.3 kW and 6.6 kW.

The power supply controller 140 receives electric quantity information sent by the battery pack 120, and sends a start/stop instruction to the low-power generator 110 according to the electric quantity state information such that the low-power generator 110 charges the battery pack 120 through the charger 130 according to the start/stop instruction.

In this embodiment, by setting a low-power generator, a battery pack, a charger, a power supply controller and the connection relationship between them, the power supply controller can receive the electric quantity state information sent by the battery pack, and send a start/stop instruction to the low-power generator according to the electric quantity state information, the low-power generator can charge the battery pack according to the received start/stop instruction sent by the power supply controller. In this embodiment, the battery pack provides a short time high power current needed by the system, and the low-power generator may run at a rated power stably, which can reduce the requirement on the peak power of the generator by the in-vehicle detection system, and improve the working efficiency. In addition, using a power supply system comprising a low-power generator, a lithium battery and other parts to substitute a high-power generator can reduce an overall weight of the in-vehicle detection system, and reduce vibrations and noises.

Figure 2A:
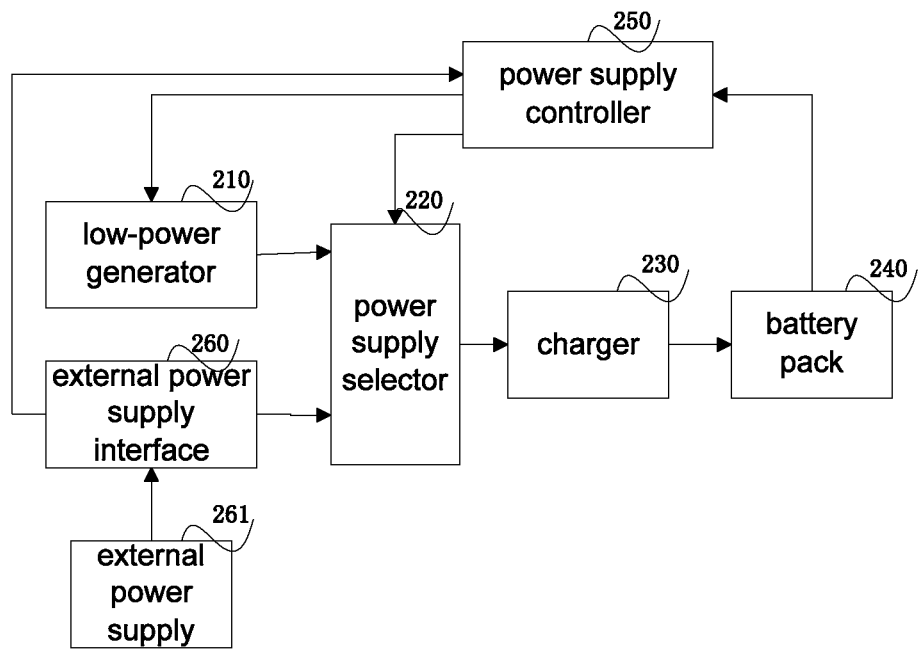
FIG. 2A is a schematic diagram of another embodiment of a power supply system for an in-vehicle detection system of the present disclosure.

FIG. 2A is a schematic diagram of another embodiment of a power supply system for an in-vehicle detection system of the present disclosure. The in-vehicle detection system may be an in-vehicle container detection system. The power supply system comprises a low-power generator 210, a power supply selector 220, a charger 230, a battery pack 240 and a power supply controller 250. The power supply controller 250 is electrically connected to the low-power generator 210, the power supply selector 220 and the battery pack 240, respectively, and the power supply controller 220 is further electrically connected to the low-power generator 210 and the charger 230, respectively; the charger 230 is electrically connected to the battery pack 240.

A power of the low-power generator 210 may be lower than a peak power of the in-vehicle container detection system. The power being generated by the low-power generator is 220V single-phase power or 380V three-phase power, wherein the low-power generator may be controlled to be started or stopped remotely, and output the current to the power supply selector 220.

The power supply selector 220 selects a low-power generator 210 or an external power supply 261 or an open circuit to be output to the charger 240 according to the setting of the power supply controller 250.

In one embodiment, the power supply system may further comprise an external power supply interface 260 electrically connected to the power supply selector 220 for accessing the external power supply 261. The external power supply may be 220V single-phase power or 380V three-phase power in a fixed location, and is adapted to a suitable voltage, such as 220V single-phase power or 380V three-phase power. The power supply controller 250 can detect a state of the external power supply through the external power supply interface 260. The power supply selector 220 will choose to connect an output of the external power supply interface 260 to an input of the charger 230, and meanwhile make the low-power generator 210 stop if an external power supply is detected. By using an external power supply, a zero emission and pollution-free effect can be achieved.

The charger 230 is typically a car charger for a pure electric car, and is used for charging the battery pack 240. The input voltage is generally a 220V single-phase voltage or a 380V three-phase voltage, and the charging power is generally 2 kW~10 kW, and the maximum charging power generally has two specifications, namely, 3.3 kW and 6.6 kW.

In one embodiment, the battery pack 240 may be a high voltage lithium battery pack comprising at least one battery set which is formed of a plurality of lithium cells connected in series or in parallel, and a total voltage is generally 100V~500V, and a total capacity is generally 5 kWh~80 kWh. The lithium battery pack has advantages of light weight, large capacity and high output current, and therefore a lithium battery pack can be chosen. In addition, since the power of the electric equipment of the in-vehicle container detection system is very large, a low voltage will result in a high current, whereas the line can hardly meet the requirement, a high voltage lithium battery pack can be chosen. The high voltage lithium battery pack comprises a battery management system, which can monitor states like a voltage, electric quantity and etc. of the battery, and send the electric quantity state information to the power supply controller 250.

The battery pack 240 is used for supplying power to the electric equipment of the in-vehicle container detection system. The battery pack 240 may further be provided with an energy feedback unit, and the battery pack 240 may use energy being fed back for charging if the electric equipment has a braking energy feedback function.

The power supply controller 250 may further receive working state information given by the main controller or accelerator of the in-vehicle container detection system, and control starting or stopping of the low-power generator 210 and configure the power supply selector 220 by combining information like electric quantity collected by the battery management system in the battery pack 240.

For example, the low-power generator 210 stops running if the power supply controller 250 detects that the in-vehicle container detection system is in a low workload state, and the electric quantity stored in the battery pack 240 is sufficient to complete inspection work of a rated time till the in-vehicle container detection system rests or transitions. In the process of the in-vehicle container detection system rests or transitions, the battery pack 240 is charged by electrically connecting to the external power supply 261 or by starting the low-power generator 210 to supplement electric quantity used in the last period of work. In this working mode, the low-power generator 210 is not started when inspection work is performed, which does not produce noise. Thus, the experience of the operating staff is good. Meanwhile, there are no vibrations influencing the accelerator, which is favorable to the performance.

The low-power generator 230 starts running if the power supply controller 250 detects that the in-vehicle container detection system is in a middle workload state. Upon detection that the accelerator is about to emit rays, the power supply controller 250 makes the low-power generator 210 stop, and restarts the low-power generator 210 till it is detected that the accelerator finishes emitting rays. After the in-vehicle container detection system completes the inspection work of a rated time, and in the process of the in-vehicle container detection system rests or transitions, the battery pack 240 will be charged by electrically connecting to the external power supply source 261 or by starting the low-power generator 210 to supplement used electric quantity of the battery pack in the last period of work if the electric quantity of the battery pack 240 is not full. In this working mode, the low-power generator 210 is intermittently started, and there are no vibrations influencing the accelerator during the scanning, which is favorable to the performance.

The low-power generator 230 keeps active running if the power supply controller 250 detects that the in-vehicle container detection system is in a high workload state. After the in-vehicle container detection system completes the inspection work of a rated time, and in the process of the in-vehicle container detection system rests or transitions, the battery pack 240 will be charged by electrically connecting to the external power supply source 261 or by starting the low-power generator 210 to supplement used electric quantity of the battery pack in the last period of work if the electric quantity of the battery pack 240 is not full. In this working mode, although the low-power generator 210 keeps active, since the power of the low-power generator 210 is small, the generated noise and vibrations are less than those of the high-power generator in the traditional solution.

In this embodiment, a power supply system comprising a low-power generator, a battery pack and other parts is set to substitute a high-power generator. If a low-power generator of 5 kW is used (about 100 kg), and a battery pack of 20 kWh is used (about 250 kg), in addition to other parts, an overall weight will be less than 400 kg, which can reduce an overall weight of the in-vehicle container detection system. Because of the battery pack is charged by the low-power generator or the external power supply, and the battery pack provides a short time high power current needed by the inspection, the low-power generator of the system can run at a rated power stably with a high efficiency. Moreover, during a low workload state, a zero emission and pollution-free effect can be achieved if an external power supply is detected in the rest area. And the present disclosure can reduce noise, and the user's experience is good. Meanwhile, it can reduce vibrations, and reduce influence on the dose stability of the X-ray beam flow generated by the accelerator, and improve the performance metrics.

Figure 2B:
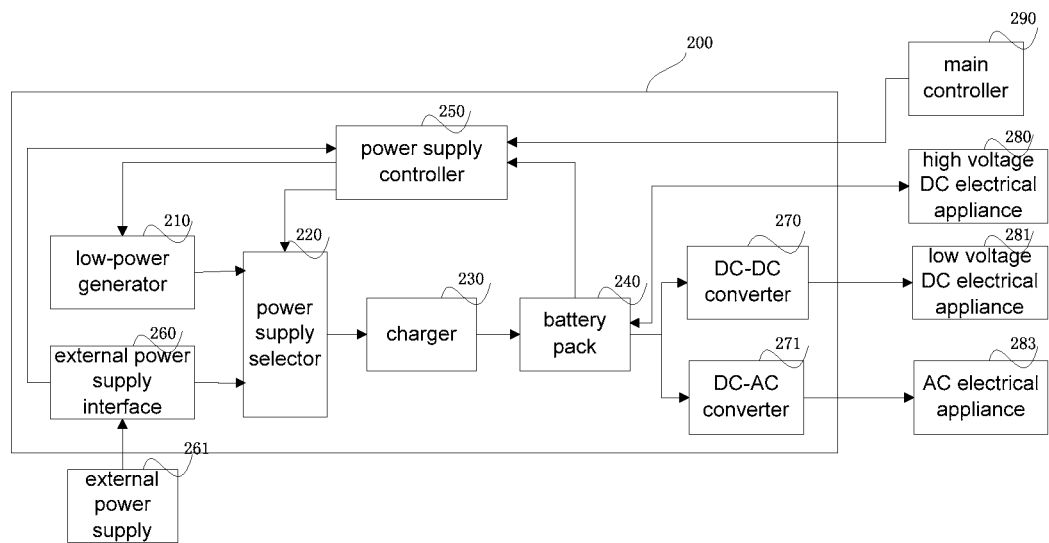
FIG. 2B is a schematic diagram of another embodiment of a power supply system for an in-vehicle detection system of the present disclosure.

In another embodiment of the present disclosure, as is shown in FIG. 2B, the power supply system 200 may further comprise a DC-DC converter 270. The DC-DC converter 270 is electrically connected to the battery pack 240 to convert a high voltage DC output by the battery pack 240 into a 24V or 12V low voltage DC, so as to supply power to a low voltage DC electrical appliance 281 (e.g., PLC, a relay, and etc.) of the in-vehicle container detection system.

The power supply system 200 may further comprise a DC-AC converter 271. The DC-AC converter 271 is electrically connected to the battery pack 240 to convert a high voltage DC output by the battery pack 240 into an 50 Hz/220V AC, so as to supply power to an AC electrical appliance 282 (e.g., a computer, a printer, and etc.) of the in-vehicle container detection system.

The battery pack 240 may further directly supply power to the high voltage DC electrical appliance 280 in the in-vehicle container detection system if the power supply system is connected to the high voltage DC electrical appliance 280, e.g., a motor or a driver.

In this embodiment, the power supply system may provide suitable voltage and current to the electrical appliances of the in-vehicle container detection system, and the power supply system is widely used, which can satisfy the power demand of the electrical appliances.

In one embodiment, the power supply controller 250 may further receive information like a workload state, configuration parameters, and etc. of the in-vehicle container detection system sent by the main controller 290, or receive a control instruction sent by the main controller, and charge the battery pack according to the control instruction. For example, the main controller sends an instruction showing the external power supply may be used to the power supply controller if an external power supply is detected, accordingly, an output of the interface of the external power supply is allowed to connect to an input of the charger, and the battery pack is charged through the external power supply. The battery pack will be charged through the low-power generator or other manners if the main controller sends an instruction to prohibit use of the external power supply.

The power supply system may well cooperate with other equipment of the existing in-vehicle container detection system, and its overall change to the vehicle body is slight and it is easy to implement.

Figure 3A:
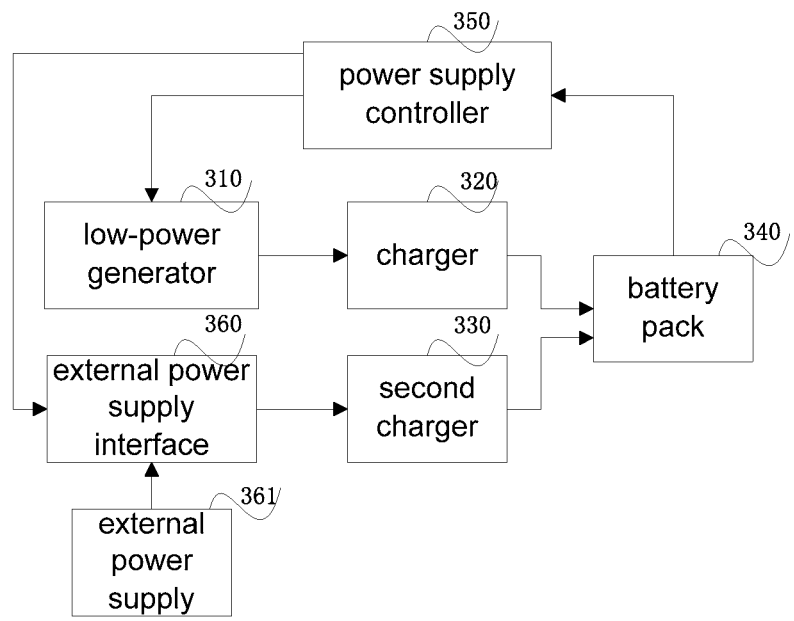
FIG. 3A is a schematic diagram of another embodiment of a power supply system for an in-vehicle detection system of the present disclosure.

FIG. 3A is a schematic diagram of another embodiment of the power supply system for the in-vehicle detection system of the present disclosure. The in-vehicle detection system may be an in-vehicle container detection system. The power supply system comprises a low-power generator 310, a charger 320, a second charger 330, a battery pack 340 and a power supply controller 350. The power supply controller 350 is electrically connected to the low-power generator 310 and the battery pack 340, respectively; and the charger 330 is electrically connected to the low-power generator 310 and the battery pack 340, respectively; the second charger 330 is electrically connected to the battery pack 340.

A power of the low-power generator 310 may be lower than a peak power of the in-vehicle container detection system. The power being generated by the low-power generator is 220V single-phase power or 380V three-phase power, wherein the low-power generator may be controlled to be started or stopped remotely, and the battery pack 340 is charged through the charger 320.

In one embodiment, the power supply system may further comprise an external power supply interface 360 electrically connected to the second charger 330 for accessing the external power supply 361. The external power supply may be 220V single-phase power or 380V three-phase power in a fixed location, and is adapted to a suitable voltage, such as 220V single-phase power or 380V three-phase power. The power supply controller 350 can detect a state of the external power supply through the external power supply interface 360. The battery pack 340 may be charged through the second charger 330 by the external power supply if an external power supply is detected, and meanwhile the low-power generator 310 stops running.

In one embodiment, the battery pack 340 may be a high voltage lithium battery pack comprising at least one battery set which is formed of a plurality of lithium cells connected in series or in parallel, and a total voltage is generally 100V~500V, and a total capacity is generally 5 kWh~80 kWh. The lithium battery pack has advantages of light weight, large capacity and high output current, and therefore a lithium battery pack can be chosen. In addition, since the power of the electric equipment of the in-vehicle container detection system is very large, a low voltage will result in a high current, whereas the line can hardly meet the requirement, a high voltage lithium battery pack can be chosen. The high voltage lithium battery pack comprises a battery management system, which can monitor states like a voltage, electric quantity and etc. of the battery, and send the electric quantity state information to the power supply controller 350.

The battery pack 340 is used for supplying power to the electric equipment of the in-vehicle container detection system. The battery pack 340 may further be provided with an energy feedback unit, and the battery pack 340 may use energy being fed back for charging if the electric equipment has a braking energy feedback function.

The power supply controller 350 may further receive working state information given by the main controller or accelerator of the in-vehicle detection system, and selects an external power supply or controls starting or stopping of the low-power generator 310 by combining electric quantity information collected by the battery management system in the battery pack 340.

For example, the working state of the in-vehicle container detection system obtained by the power supply controller 350 includes a scanning state, a standby state or a stopped state. Power consumption per unit time in the three states can be evaluated through recording the working periods of the in-vehicle container detection system in different scanning states, and obtaining change information of the electric quantity from the battery pack. And a time proportion of working periods of the in-vehicle container detection system in each of different working states can further be calculated and worked out, i.e., calculate a workload state. For example, it is a high workload state if the time proportion of the scanning state, the standby state and the stopped state in one day is 1:3:5, and it is a low workload state if the time proportion of the scanning state, the standby state and the stopped state in one day is 1:3:10. Those skilled in the art should understand that it is an illustration, and the states can be set to be in a low workload, a middle workload or a high workload under different proportions according to the specific situation in actual application. The workload state may also be manually set through an external controller. In one embodiment, record and make statistics on time proportions in each of different working states in the past period of time, and predict a workload state during a future period of time. The power supply controller can predict average power consumption per unit time during a future period of time according to the workload state and the power consumption per unit time in each working state of the in-vehicle detection system, and predicts whether the remaining electric quantity is sufficient for the operation of this day or this time according to the configuration parameters, current time, working states, the predicted average power consumption per unit time and the remaining electric quantity of the battery, if not, the low-power generator will be started, if yes, the low-power generator will be stopped.

In this embodiment, a power supply system comprising a low-power generator, a battery pack and other parts is set to substitute a high-power generator. If a low-power generator of 5 kW is used (about 100 kg), and a battery pack of 20 kWh is used (about 250 kg), in addition to other parts, an overall weight will be less than 400 kg, which can reduce an overall weight of the in-vehicle container detection system. The battery pack is charged by the low-power generator or the external power supply, and the battery pack provides a short time high power current needed by the inspection. The low-power generator of the system can run at a rated power stably with a high efficiency. Moreover, during a low workload state, a zero emission and pollution-free effect can be achieved if there is an external power supply in the rest area. And the present disclosure can reduce noise, and the user's experience is good. Meanwhile, it can reduce vibrations, and reduce influence on the dose stability of the X-ray beam flow generated by the accelerator, improve the performance metrics, and further improve the imaging quality.

Figure 3B:
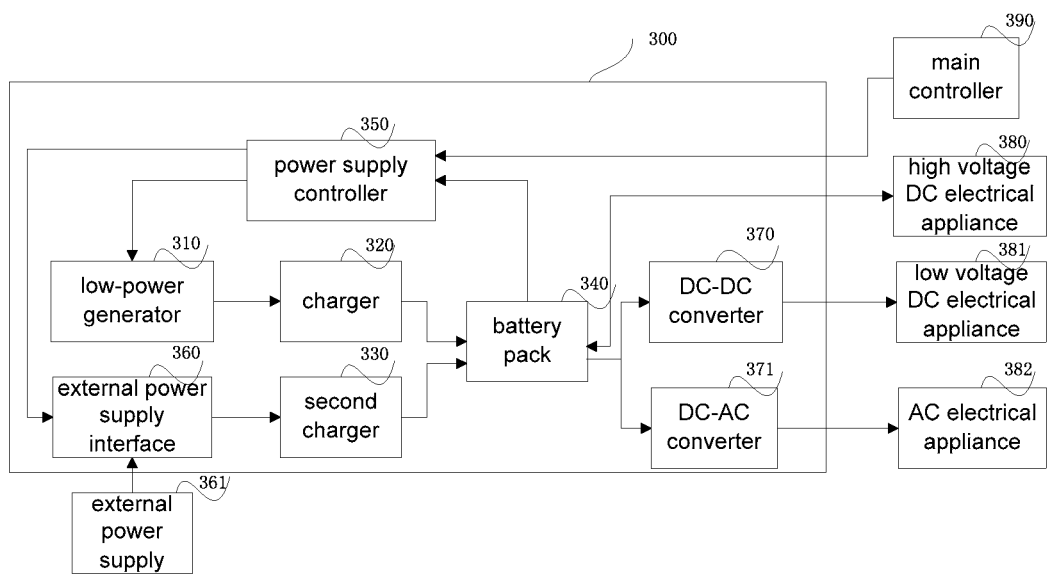
FIG. 3B is a schematic diagram of another embodiment of a power supply system for an in-vehicle detection system of the present disclosure.

In another embodiment of the present disclosure, as is shown in FIG. 3B, the power supply system 300 may further comprise a DC-DC converter 370. The DC-DC converter 370 is electrically connected to the battery pack 340 to convert a high voltage DC output by the battery pack 240 into a 24V or 12V low voltage DC, so as to supply power to a low voltage DC electrical appliance 381 (e.g., PLC, a relay, and etc.) of the in-vehicle container detection system.

The power supply system 300 may further comprise a DC-AC converter 371. The DC-AC converter 371 is electrically connected to the battery pack 340 to convert a high voltage DC output by the battery pack 340 into an 50 Hz/220V AC, so as to supply power to an AC electrical appliance 382 (e.g., a computer, a printer, and etc.) of the in-vehicle container detection system.

The battery pack 340 may further directly supply power to the high voltage DC electrical appliance 380 (e.g., a motor and a driver) in the in-vehicle container detection system.

In this embodiment, the power supply system may provide suitable voltage and current to the electrical appliances of the in-vehicle container detection system, and the power supply system is widely used, which can satisfy the power demand of the electrical appliances.

In another embodiment, the power supply controller 350 may further receive information like a workload state, configuration parameters, and etc. of the in-vehicle container detection system sent by the main controller 390, or receive a control instruction sent by the main controller, and charge the battery pack according to the control instruction. For example, the main controller sends an instruction showing the external power supply may be used to the power supply controller if an external power supply is detected, accordingly, an output of the interface of the external power supply is allowed to connect to an input of the charger, and the battery pack is charged through the external power supply. The battery pack will be charged through the low-power generator or other manners if the main controller sends an instruction to prohibit use of the external power supply.

The power supply system can well cooperate with other equipment of the existing in-vehicle container detection system, and its overall change to the vehicle body is slight and it is easy to implement.

Figure 4:
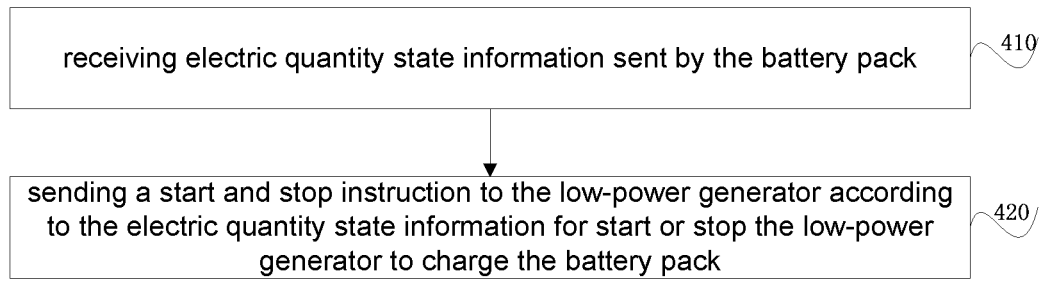
FIG. 4 is a flow diagram of one embodiment of a control method of a power supply system for an in-vehicle detection system of the present disclosure.

FIG. 4 is a flow diagram of one embodiment of a control method of a power supply system for an in-vehicle detection system of the present disclosure. The step is performed by a power supply controller.

A step 410 of receiving electric quantity state information sent by the battery pack.

The battery pack may be a high voltage lithium battery pack comprising at least one battery set which is formed of a plurality of lithium battery cells in series or in parallel, and a total voltage is generally 100V~500V, and a total capacity is generally 5 kWh~80 kWh. The high voltage lithium battery pack comprises a battery management system, which can monitor states like a voltage of the battery, and send the electric quantity information to the power supply controller. The lithium battery pack has advantages of light weight, large capacity and high output current, and a lithium battery pack can be chosen. In addition, since the power of the in-vehicle container detection system is very large, a low voltage will result in a high current, whereas the line can hardly meet the requirement, therefore a high voltage lithium battery pack can be chosen.

A step 420 of sending a start and stop instruction to the low-power generator according to the electric quantity state information for start or stop the low-power generator to charge the battery pack.

That is, it is determined whether the remaining electric quantity of the battery pack is able to satisfy the power demand of the in-vehicle detection system. For example, it is determined whether the electric quantity state information is greater than a threshold. If yes, a stop instruction will be sent to the low-power generator, i.e., supplying power to the electric equipments of the in-vehicle detection system by the battery pack; otherwise, a start instruction will be sent to the low-power generator for start the low-power generator to charge the battery pack.

A power of the low-power generator may be lower than a peak power of the in-vehicle detection system. In one embodiment, the power of the low-power generator is close to an average power of the container detection system, and the power being generated by the low-power generator is 220V single-phase power or 380V three-phase power.

The battery pack may directly supply power to the high voltage DC electrical appliances in the in-vehicle detection system, for example, directly supply power to a motor and a driver. The battery pack may use the energy being fed back for charging if the motor and the driver in the high voltage DC electrical appliances have a braking energy feedback function. Or a DC-DC converter may be used to convert the high voltage DC output by the battery pack into a 12V low voltage DC, and supply power to the DC electrical appliances adapted to the low voltage DC, for example, supply power to the PLC, the relay and etc. Or a DC-AC converter may be used to convert the high voltage DC output by the battery pack into 50 Hz/220V AC, and supply power to the AC electrical appliances adapted to the power frequency AC, for example, supply power to the computer, printer, and etc.

In this embodiment, a start or stop instruction is sent to the low-power generator according to the electric quantity state information sent by the battery pack for start or stop the low-power generator to charge the battery pack. The low-power generator in this embodiment may run at a rated power stably, which improves the working efficiency. Moreover, a power supply system comprising a low-power generator, a lithium battery pack and other parts is used to substitute the high-power generator, which can reduce an overall weight of the in-vehicle detection system, and can reduce vibrations and noises.

Figure 5:
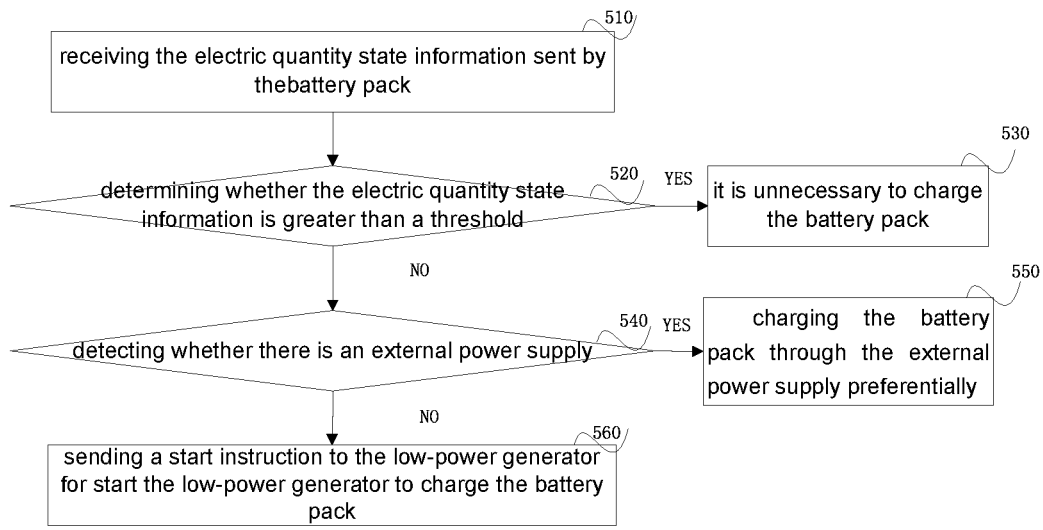
FIG. 5 is a flow diagram of another embodiment of a control method of a power supply system for an in-vehicle detection system of the present disclosure.

FIG. 5 is a flow diagram of another embodiment of a control method of a power supply system of an in-vehicle detection system of the present disclosure.

A step 510 of receiving the electric quantity state information sent by the battery pack.

A step 520 of determining whether the electric quantity state is greater than a threshold based on the electric quantity state information. If yes, perform step 530; otherwise, perform step 540.

That is, it is determined whether the remaining electric quantity of the battery pack is able to satisfy the power demand of the electric equipment of the in-vehicle detection system.

A step 530 of it is unnecessary to charge the battery pack.

That is, power may be supplied to the in-vehicle detection system by a battery pack.

A step 540 of detecting whether there is an external power supply, and if an external power supply is detected, perform step 550; otherwise, perform step 560.

An external power supply interface may be used to detect whether there is an external power supply.

A step 550 of charging the battery pack through the external power supply preferentially.

In one embodiment, a control instruction of the main controller may also be received. The external power supply will be preferentially used to charge the battery pack if the control instruction allows the use of an external power supply. And perform step 560, i.e., charge the battery pack through the low-power generator if the control instruction does not allow the use of the external power supply.

A step 560 of sending a start instruction to the low-power generator for start the low-power generator to charge the battery pack.

In one embodiment, the low-power generator may keep running till the electric quantity of the battery pack is a full state.

In the embodiment of the present disclosure, it is determined whether the remaining electric quantity of the battery pack is able to satisfy the power demand of the electrical appliances of the in-vehicle detection system. If not, an external power supply will preferentially be used to charge the battery pack, which can achieve the effect of zero emission and no pollution. And a low-power generator is started to charge the battery pack if the external power supply is not detected. The low-power generator may run at a rated power stably with a high efficiency with low noise and small vibrations being generated, which improves the performance metrics.

In another embodiment, the external power supply may also be used to charge the battery pack if the presence of an external power supply is detected and the electric quantity of the battery pack is not full.

Figure 6:
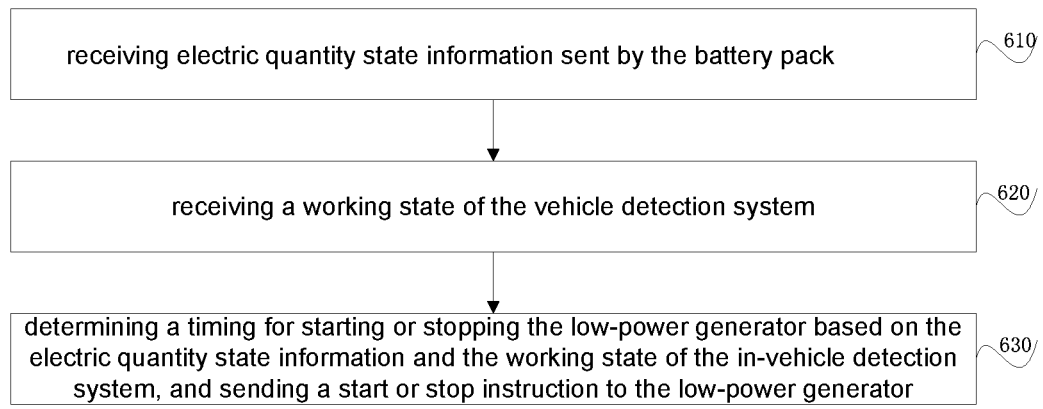
FIG. 6 is a flow diagram of another embodiment of a control method of a power supply system for an in-vehicle detection system of the present disclosure.

FIG. 6 is a flow diagram of another embodiment of a control method of a power supply system of an in-vehicle detection system of the present disclosure.

A step 610 of receiving electric quantity state information sent by the battery pack.

A step 620 of receiving a working state of the vehicle detection system.

The working state of the in-vehicle detection system mainly comprises a scanning state, a standby state and a stopped state. The working state can be given by the main controller, or manually set by the operating staff, or automatically detected according to information like the electric quantity of the battery. The accelerator in the detection system may be in a state of emitting rays or non-emitting rays if the working state of the in-vehicle detection system is in a scanning state.

A step 630 of determining a timing for starting or stopping the low-power generator based on the electric quantity state information and the working state of the in-vehicle detection system, and sending a start or stop instruction to the low-power generator.

In one embodiment, it may be firstly considered whether there is an external power supply if it is determined that it is necessary to charge the battery pack.

The step may be performed according to different strategies if an external power supply is not detected, for example:

Strategy 1

Acquire power consumption per unit time in each working state of the in-vehicle detection system. For example, record time in each of different working states, and obtain change information of the electric quantity from the battery pack, thereby estimating power consumption per unit time in the three states.

Acquire a workload state of the in-vehicle detection system, i.e., calculate time proportions of working period of the in-vehicle detection system in each of different working states. For example, it is in a high workload state if a time proportion of the scanning state, the standby state and the stopped state in one day is 1:3:5. And it is in a low workload state if a time proportion of the scanning state, the standby state and the stopped state in one day is 1:3:10. Those skilled in the art should understand that it is only an illustration here, the states may be set to be in a low workload, a middle workload or a high workload under different proportions according to the specific situation in actual application.

In one embodiment, record and make statistics of time proportions in each of different working states in the past period of time, and predict a workload state during a future period of time.

Predict average power consumption per unit time during a future period of time according to the workload state and the power consumption per unit time in each working state of the in-vehicle detection system.

Predict whether the remaining electric quantity is sufficient for the operation of this day or this time according to the configuration parameters, current time, working states, the predicted average power consumption per unit time and the remaining electric quantity of the battery. It will be unnecessary to start the low-power generator if the demand of the operation of this day or this time can be satisfied by the remaining electric quantity; otherwise, the low-power generator will be started, and the battery pack will be charged by the low-power generator.

Strategy 2

Send a stop instruction to the low-power generator if the remaining electric quantity of the battery is greater than a certain value and the in-vehicle detection system is in the enter-scanning state, and send a start instruction to the low-power generator if the vehicle detections system is in the exit-scanning state. Since the low-power generator is intermittently started, there are no vibrations influencing the accelerator during the in-vehicle detection system is scanning, which is favorable to the performance.

In one embodiment, further determine whether an accelerator starts to emit rays if the in-vehicle detection system is in the enter-scanning state. Send a stop instruction to the low-power generator if the accelerator starts to emit rays, and send a start instruction to the low-power generator if the accelerator finishes emitting rays.

Strategy 3

Determine what workload state the in-vehicle detection system is in, and whether the remaining electric quantity is greater than a certain value.

Send a stop instruction to the low-power generator if the in-vehicle detection system is in a low workload state and the remaining electric quantity of the battery pack is greater than a threshold.

For example, the low-power generator stops running during work if the in-vehicle container detection system is in a low workload state. The electric quantity stored in the battery pack is sufficient to finish inspection work of a rated time till the in-vehicle detection system rests or transitions. In the process of the in-vehicle container detection system rests or transitions, the battery pack is charged by electrically connecting to the external power supply source or by starting the low-power generator to supplement used electric quantity of the battery pack in the last period of work. In this working mode, the low-power generator is not started when inspection work is performed, which does not produce noise, hence, the experience of the operating staff is good. Meanwhile, there are no vibrations influencing the accelerator during the scanning, which is favorable to the performance.

Send an intermittent start or stop instruction to the low-power generator if the in-vehicle detection system is in a middle workload state and the remaining electric quantity of the battery pack is greater than the threshold.

For example, the low-power generator starts running during work if the in-vehicle container detection system is in a middle workload state. Upon detection that the accelerator is about to emit rays, the power supply controller makes the low-power generator stop, and restarts the low-power generator if it is detected that the accelerator finishes emitting rays. After the in-vehicle container detection system completes the inspection work of a rated time, and in the process of the in-vehicle container detection system rests or transitions, the battery pack will be charged by electrically connecting to the external power supply source or by starting the low-power generator to supplement used electric quantity of the battery pack in the last period of work if the electric quantity of the battery pack is not full. In this working mode, the low-power generator is intermittently started, and there are no vibrations influencing the accelerator during the scanning, which is favorable to the performance.

It will be unnecessary to consider about the electric quantity state of the battery, and keep the low-power generator running if the in-vehicle detection system is in a high workload state.

For example, the low-power generator keeps active during work if the in-vehicle container detection system is in a high workload state. After the in-vehicle container detection system completes the inspection work of a rated time, and in the process of the in-vehicle container detection system rests or transitions, the battery pack will be charged by electrically connecting to the external power supply source or by starting the low-power generator to supplement used electric quantity of the battery pack in the last period of work if the electric quantity of the battery pack is not full. In this working mode, although the low-power generator keeps active, since the power of the low-power generator is small, the generated noise and vibrations are less than those of the high-power generator in the traditional solution.

Those skilled in the art should understand that one or more of the above strategies should be consulted according to different situations so as to control the timing for starting the low-power generator.

In this embodiment, the timing for starting or stopping the low-power generator is determined through using different strategies, and a start or stop instruction is sent to the low-power generator. The low-power generator can run at a rated power stably with a high efficiency. Moreover, during the low workload state, a zero emission and pollution-free effect can be achieved if an external power supply is detected in the rest area. And the present disclosure can reduce noise, and the user's experience is good. Meanwhile, it can reduce vibrations, and improve the performance metrics.

Figure 7:
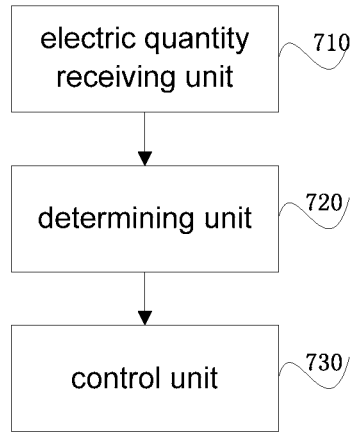
FIG. 7 is a schematic diagram of one embodiment of a power supply controller of the present disclosure.

FIG. 7 is a schematic diagram of an embodiment of a power supply controller of the present disclosure. The power supply controller comprises an electric quantity state receiving unit 710, a determining unit 720 and a control unit 730.

The electric quantity state receiving unit 710 is used for receiving electric quantity state information sent by the battery pack, and sending the electric quantity state information to the determining unit 720.

The battery pack may be a high voltage lithium battery pack comprising at least one battery set which is formed of a plurality of lithium cells connected in series or in parallel, and a total voltage is generally 100V~500V, and a total capacity is generally 5 kWh~80 kWh. The high voltage lithium battery comprises a battery management system, which can monitor states like a voltage of the battery, and send the electric quantity information to the power supply controller. The lithium battery has advantages of light weight, large capacity and high output current, and therefore a lithium battery pack can be chosen. In addition, since the power of the electrical appliances is very large, a low voltage will result in a high current, whereas the line can hardly meet the requirement, a high voltage lithium battery pack can be chosen.

The determining unit 720 is used for determining whether the electric quantity state satisfies the working requirement of the in-vehicle detection system based on the electric quantity state information, and sending a determination result to the control unit 730.

For example, it is determined whether the electric quantity state is greater than a threshold. If the electric quantity state is greater than the threshold, the working requirement of the in-vehicle detection system will be satisfied; otherwise, the working requirement of the in-vehicle detection system will not be satisfied.

The control unit 730 is used for receiving a determination result of the electric quantity state determining unit 720. A start instruction will be sent to the low-power generator to charge the battery pack if the electric quantity state does not satisfy the working requirement of the in-vehicle detection system.

A power of the low-power generator may be lower than a peak power of the in-vehicle detection system. In one embodiment, the power of the low-power generator is close to an average power of the container detection system, and the power being generated by the low-power generator is 220V single-phase power or 380V three-phase power.

The battery pack may directly supply power to the high voltage DC electrical appliances in the in-vehicle detection system, for example, directly supply power to a motor and a driver. The battery pack may use the energy being fed back for charging if the motor and the driver in the high voltage DC electrical appliances have a braking energy feedback function. Or a DC-DC converter may be used to convert the high voltage DC output by the battery pack into a 24V or 12V low voltage DC, and supply power to the DC electrical appliances adapted to the low voltage DC, for example, supply power to the PLC, the relay and etc. Or a DC-AC converter may be used to convert the high voltage DC output by the battery pack into 50 Hz/220V AC, and supply power to the AC electrical appliances adapted to the power frequency AC, for example, supply power to the computer, printer, and etc.

In this embodiment, a start or stop instruction is sent to the low-power generator according to the electric quantity state information sent by the battery pack for start or stop the low-power generator to charge the battery pack. The low-power generator in this embodiment may run at a rated power stably, which improves the working efficiency. Moreover, a power supply system comprising a low-power generator, a lithium battery pack and other parts is used to substitute the high-power generator, which can reduce an overall weight of the in-vehicle detection system, and can reduce vibrations and noises.

Figure 8:
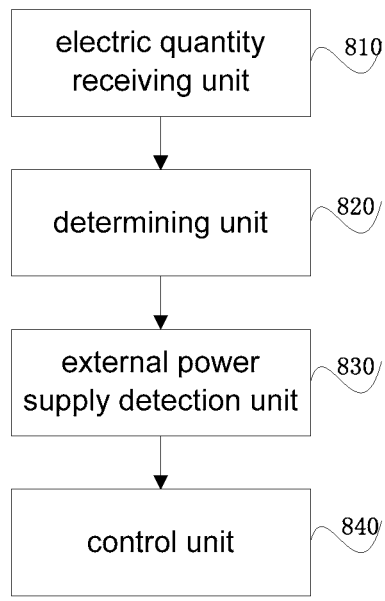
FIG. 8 is a schematic diagram of another embodiment of a power supply controller of the present disclosure.

FIG. 8 is a schematic diagram of another embodiment of a power supply controller of the present disclosure. The power supply controller comprises an electric quantity state receiving unit 810, a determining unit 820, an external power supply detection unit 830 and a control unit 840.

The electric quantity state receiving unit 810 is used for receiving electric quantity state information sent by the battery pack, and sending the electric quantity state information to the determining unit 820.

The determining unit 820 is used for determining whether the electric quantity state satisfies the working requirement of the in-vehicle detection system, and sending a determination result to the external power supply detection unit 830.

It will be unnecessary to charge the battery pack if the remaining electric quantity of the battery pack can satisfy the power demand of the electric equipment of the in-vehicle detection system.

The external power supply detection unit 830 is used for detecting whether there is an external power supply, and sending the detection result to the control unit 840.

The presence of an external power supply can be detected through an external power supply interface.

The control unit 840 is used for receiving a detection result from the external power supply detection unit 830. The battery pack will be charged preferentially through the external power supply if the detection result is that there is an external power supply.

In one embodiment, the control unit 840 will send a start instruction to the low-power generator the external power supply is not detected, and send a stop instruction to the low-power generator if the electric quantity state information received by the electric quantity state receiving unit represents that the electric quantity of the battery pack is in full state.

In another embodiment, once the presence of the external power supply is detected, and the electric quantity state of the battery pack is not full, the external power supply may be used to charge the battery pack.

In another embodiment, the control unit 840 may also receive a control instruction of the main controller. The external power supply will be preferentially used to charge the battery pack if the control instruction allows the use of an external power supply, and a low-power generator will be used to charge the battery pack if the control instruction does not allow the use of the external power supply.

In the embodiment of the present disclosure, it is determined whether the remaining electric quantity of the battery pack is able to satisfy the power demand of the electrical appliances of the in-vehicle detection system. If not, an external power supply will preferentially be used to charge the battery pack, which can achieve the effect of zero emission and no pollution. And a low-power generator is started to charge the battery pack if the external power supply is not detected. The low-power generator may run at a rated power stably with a high efficiency with low noise and small vibrations being generated, which improves the performance metrics.

Figure 9A:
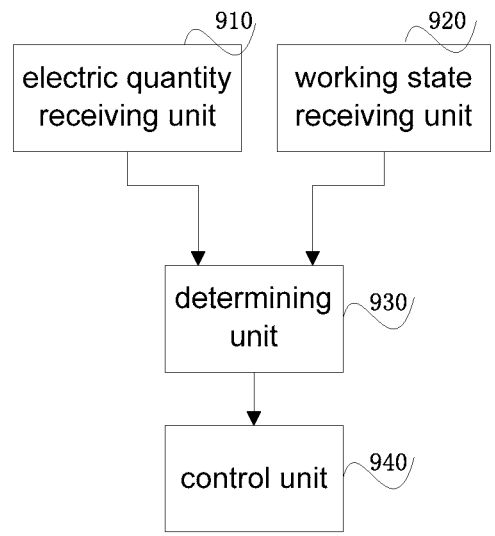
FIG. 9A is a schematic diagram of another embodiment of a power supply controller of the present disclosure.

In another embodiment of the present disclosure, as is shown in FIG. 9A, the power supply controller comprises an electric quantity state receiving unit 910, a working state receiving unit 920, a determining unit 930, and a control unit 940.

The electric quantity state receiving unit 910 is used for receiving electric quantity state information sent by the battery pack, and sending the electric quantity state information to the determining unit 930.

The electric quantity state information comprises the remaining electric quantity.

The working state receiving unit 920 is used for receiving a working state of the in-vehicle detection system, and sending the electric quantity state information to the determining unit 930.

The working state of the in-vehicle detection system mainly comprises a scanning state, a standby state and a stopped state. The working state can be given by the main controller, or manually set by the operating staff, or automatically detected according to information like the electric quantity of the battery. The accelerator in the detection system may be in a state of emitting rays or non-emitting rays if the working state of the in-vehicle detection system is in a scanning state.

The determining unit 930 is used for determining the timing for starting or stopping the low-power generator based on the electric quantity state information and the working state of the in-vehicle detection system, and sending a start or stop instruction to the low-power generator.

Figure 9B:
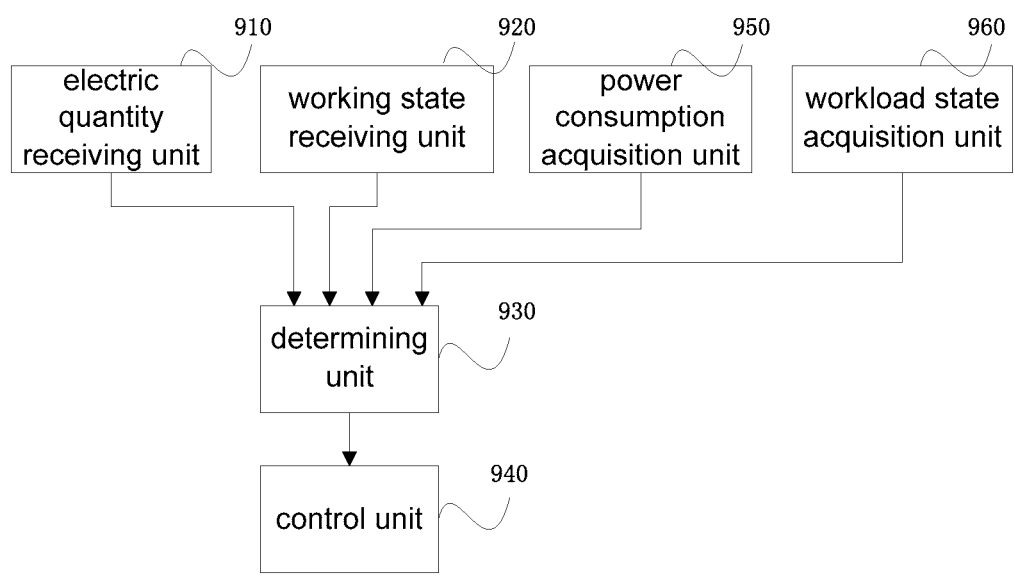
FIG. 9B is a schematic diagram of another embodiment of a power supply controller of the present disclosure.

Wherein, as is shown in FIG. 9B, in one embodiment, a power consumption acquisition unit 950 may further be included for acquiring power consumption per unit time in each working state of the in-vehicle detection system, and sending the power consumption per unit time in each working state to the determining unit 930.

For example, the power supply controller may record time in each of different working states, and obtain change information of the electric quantity from the battery pack, thereby estimating power consumption per unit time in the three states. Predict average power consumption per unit time during a future period of time according to the workload state and the power consumption per unit time in each working state of the in-vehicle detection system.

In one embodiment, a workload state acquisition unit 960 may further be comprised for acquiring a workload state of the in-vehicle detection system, and sending the workload state to the determining unit 930, i.e., calculating time proportions of working period of the in-vehicle detection system in each of different working states. For example, it is a high workload state if the time proportion of the scanning state, the standby state and the stopped state in one day is 1:3:5, and it is a low workload state if the time proportion of the scanning state, the standby state and the stopped state in one day is 1:3:10. Those skilled in the art should understand that it is an illustration here, and the state can be set to be low workload, middle workload or high workload under different proportions according to the specific situation in actual application.

In one embodiment, the workload state acquisition unit 960 records and makes statistics of time proportions in each of different working states in the past period of time, and predicts a workload state during a future period of time.

The determining unit 930 is used for predicting whether the remaining electric quantity of the battery pack satisfies the working requirement of the in-vehicle detection system according to the working states, the predicted workload state of the in-vehicle detection system and power consumption per unit time in each working state.

The control unit 940 will send a start instruction to the low-power generator according to the predicted outcome by the determining unit 930, if the remaining electric quantity does not satisfy the working requirement of the in-vehicle detection system. And the control unit 940 will send a stop instruction to the low-power generator if the remaining electric quantity satisfies the working requirement of the in-vehicle detection system.

Figure 9C:
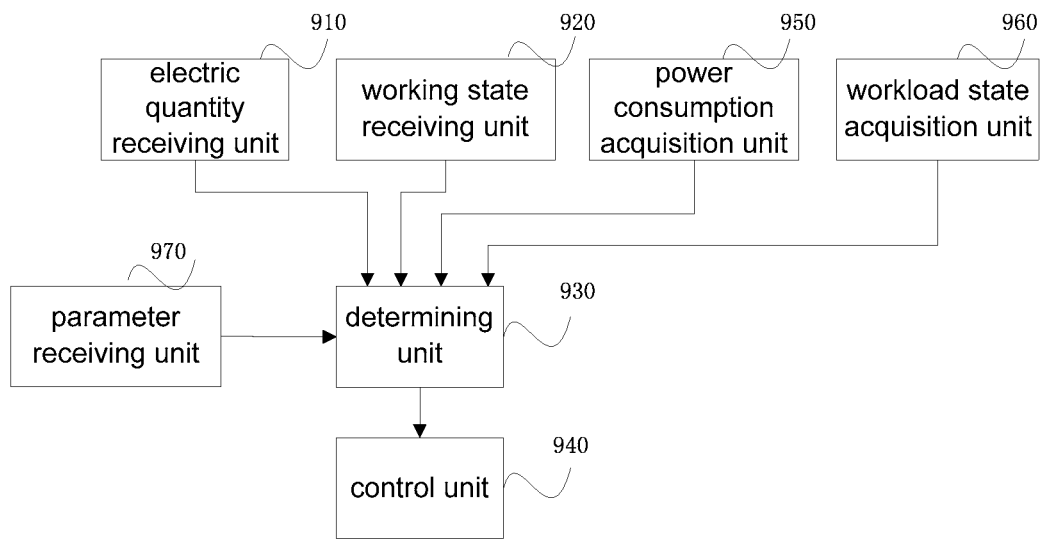
FIG. 9C is a schematic diagram of another embodiment of a power supply controller of the present disclosure.

In another embodiment, as is shown in FIG. 9C, the power supply controller may further comprise a parameter receiving unit 970 for receiving configuration parameters and current time.

The determining unit 930 is used for predicting average power consumption per unit time during a future period of time according to the workload state and the power consumption per unit time in each working state of the in-vehicle detection system, and predicting whether the remaining electric quantity of the battery pack satisfies the working requirement of the in-vehicle detection system according to the configuration parameters, the current time, the working state, the predicted average power consumption per unit time and the remaining electric quantity of the battery pack, and sending the predicted outcome to the control unit 940.

The control unit 940 will send a start instruction to the low-power generator according to the determination result of the determining unit 930, if the determination result is that the remaining electric quantity does not satisfy the working requirement of the in-vehicle detection system. And the control unit 940 will send a stop instruction to the low-power generator if the remaining electric quantity satisfies the working requirement of the in-vehicle detection system.

In another embodiment, also as shown in FIG. 9A, the electric quantity state receiving unit 910 is used for receiving electric quantity state information sent by the battery pack, and sending the electric quantity state information to the determining unit 930.

The working state receiving unit 920 is used for receiving a working state of the in-vehicle detection system, and sending the working state information to the determining unit 930.

The control unit 940 is used for sending a stop instruction to the low-power generator if the remaining electric quantity is greater than a certain value and the in-vehicle detection system is in the enter-scanning state, and sending a start instruction to the low-power generator if the vehicle detections system is in the exit-scanning state.

Further, the determining unit 930 is also used for determining whether the remaining electric quantity is greater than a certain value, and whether the accelerator finishes emitting rays.

The control unit 940 is used for sending a stop instruction to the low-power generator if the remaining electric quantity is greater than a certain value and the accelerator starts to emit rays, and sending a start instruction to the low-power generator if the accelerator finishes emitting rays.

Since the low-power generator is intermittently started, there are no vibrations influencing the accelerator during the scanning, which is favorable to the performance.

In another embodiment, the determining unit 930 is used for determining a current workload state of the in-vehicle detection system and determining whether the remaining electric quantity of the battery pack is greater than a threshold. The workload state may be determined by a time proportion of working periods of the in-vehicle detection system in each of different working states in a period of time.

The control unit 940 will send a stop instruction to the low-power generator according to the determination result of the determining unit 930. If the in-vehicle detection system is a low workload state and the remaining electric quantity of the battery pack is greater than a threshold; the control unit 940 will send an intermittent start instruction to the low-power generator if the in-vehicle detection system is in a middle workload state and the remaining electric quantity of the battery pack is greater than the threshold; and the control unit 940 will send a start instruction to the low-power generator if the in-vehicle detection system is in a high workload state.

For example, the low-power generator stops running during work if the detection system is in a low workload state. The electric quantity stored in the battery pack is sufficient to finish inspection work of a rated time till the detection system rests or transitions. In the process of the in-vehicle container detection system rests or transitions, the battery pack is charged by electrically connecting to the external power supply source or by starting the low-power generator to supplement used electric quantity of the battery pack in the last period of work. In this working mode, the low-power generator is not started when inspection work is performed, which does not produce no noise, hence, the experience of the operating staff is good. Meanwhile, there are no vibrations influencing the accelerator during the scanning, which is favorable to the performance.

The low-power generator starts running during work if the in-vehicle container detection system is in a middle workload state. The power supply controller makes the low-power generator stop if it is detection that the accelerator is about to emit rays, and restarts the low-power generator if it is detected that the accelerator finishes beam. When inspection work of a rated time is completed, in the process of the in-vehicle container detection system rests or transitions, the battery pack will be charged by electrically connecting to the external power supply source or by starting the low-power generator to supplement used electric quantity of the battery pack in the last period of work if the electric quantity of the battery pack is not full. In this working mode, the low-power generator is intermittently started, and there are no vibrations influencing the accelerator during the scanning, which is favorable to the performance.

The low-power generator keeps active during work if the in-vehicle container detection system is in a high workload state. After the in-vehicle container detection system completes the inspection work of a rated time, and in the process of the in-vehicle container detection system rests or transitions, the battery pack will be charged by electrically connecting to the external power supply source or by starting the low-power generator to supplement used electric quantity of the battery pack in the last period of work if the electric quantity of the battery pack is not full. In this working mode, although the low-power generator keeps active, since the power of the low-power generator is small, the generated noise and vibrations are less than those of the high-power generator in the traditional solution.

In another embodiment of the present disclosure, an in-vehicle detection system may specifically be an in-vehicle container detection system. The detection system comprises the power supply system. In another embodiment, the detection system comprises the power supply controller. Since the in-vehicle detection system is used in different locations, the difference between the workloads is tremendous. For example, in the busiest port, the in-vehicle detection system may scan over 100 container trucks, and work for 48 hours. However, in border inspection, the in-vehicle detection system may only scan several container trucks. Since the in-vehicle detection system of the present disclosure is provided with a low-power generator, a battery pack and etc., it not only can satisfy the requirement of the peak power of the electric equipment, but also can save energy when there is a low power consumption, which can arrive at the situation where loads change in a large range, thereby improving the efficiency. Moreover, the low-power generator of the in-vehicle detection system of the present disclosure is combined with the lithium battery pack, which reduces an overall weight, and is favorable to the movement of the vehicle. Moreover, when the low-power generator is started, since the power of the low-power generator is small, the noises and vibrations being generated are less than those of a high-power generator in the traditional solution, which improves the user's experience and is favorable to improving the imaging quality.

In another embodiment, the in-vehicle detection system may further comprises a main controller. The power supply system receives various control instructions sent by the main controller, and is combined with the main control instruction to perform the corresponding operation.

Those skilled in the art should understand that one or more of the above strategies should be consulted according to different situations so as to control the timing for starting the low-power generator.

In this embodiment, the timing for starting and stopping the low-power generator is determined through using different strategies, and a start and stop instruction is sent to the low-power generator. The low-power generator can run at a rated power stably with a high efficiency. Moreover, during the low workload state, a zero emission and pollution-free effect can be achieved if an external power supply is detected in the rest area. And the present disclosure can reduce noise, and the user's experience is good. Meanwhile, it can reduce vibrations, and improve the performance metrics.

Although some particular embodiments of the present disclosure have been explained in details through examples, those skilled in the art should understand that the above examples are only for explanations instead of limiting the scope of the present disclosure. Those skilled in the art should understand that the above embodiments may be modified without departing from the scope and spirit of the present disclosure. The scope of the present disclosure is defined by the claims being attached.

The invention claimed is:

1. A power supply system for an in-vehicle detection system, comprising:
    a low-power generator;
    a battery pack for supplying power to the in-vehicle detection system;
    a charger electrically connected to the low-power generator and the battery pack, respectively; and
    a power supply controller electrically connected to the battery pack and the low-power generator, respectively, and configured to:
    receive electric quantity state information sent by the battery pack,
    detect whether there is an external power supply,
    receive a working state of the in-vehicle detection system, wherein the working state includes a scanning state, a standby state or a stopped state,
    acquire power consumption per unit time in each working state of the in-vehicle detection system,
    acquire a workload state of the in-vehicle detection system, wherein the workload state is determined based on a proportion of working periods of the in-vehicle detection system in each of different working states,
    predict whether the remaining electric quantity of the battery pack satisfies the working requirement of the in-vehicle detection system according to the electric quantity state information, the working state workload state and power consumption per unit time in each working state of the in-vehicle detection system,
    send a start instruction to the low-power generator to charge the battery pack if the remaining electric quantity of the battery pack does not satisfy the working requirement of the in-vehicle detection system and the external power supply is not detected,
    control the external power supply to charge the battery pack if the remaining electric quantity of the battery pack does not satisfy the working requirement of the in-vehicle detection system and the external power supply is detected, and
    send a stop instruction to the low-power generator if the remaining electric quantity of the battery pack satisfies the working requirement of the in-vehicle detection system.

2. The power supply system according to claim 1, further comprising:
    a power supply selector electrically connected to the charger, the power supply controller and the low-power generator, respectively, for making a selection between the external power supply and the low-power generator; or
    a second charger electrically connected to the battery pack, for charging the battery pack from an external power supply.

3. The power supply system according to claim 1, wherein the battery pack is a lithium battery pack, and the lithium battery pack comprising:
    at least one battery set formed of a plurality of lithium battery cells connected in series or in parallel; and
    a battery management system for monitoring an electric quantity state of the battery set and sending electric quantity state information to the power supply controller.

4. The power supply system according to claim 3, further comprising:
    at least one of a DC-DC converter or a DC-AC converter, wherein the DC-DC converter is electrically connected to the lithium battery pack and is used for converting a high voltage DC output from the lithium battery pack into a low voltage DC, and the DC-AC converter is electrically connected to the lithium battery pack and is used for converting a high voltage DC output from the lithium battery pack into a power frequency AC.

5. The power supply system according to claim 1, wherein the battery pack is further used for receiving electric energy fed back by the in-vehicle detection system.

6. An in-vehicle detection system, comprising the power supply system according to claim 1.

7. The in-vehicle detection system according to claim 6, wherein the power supply controller is further configured to:
    receive configuration parameters and current time;

predict average power consumption per unit time during a future period of time according to the workload state and the power consumption per unit time in each working state of the in-vehicle detection system; and predict whether the remaining electric quantity of the battery pack satisfies the working requirement of the in-vehicle detection system according to the configuration parameters, the current time, the working state, the predicted average power consumption per unit time and the remaining electric quantity of the battery pack.

8. The in-vehicle detection system according to claim 6, further comprising:

a main controller for sending a control instruction to the power supply controller of the power supply system to make the power supply controller charges the battery pack according to the control instruction.

9. A control method of a power supply system for an in-vehicle detection system, comprising:

receiving electric quantity state information sent by a battery pack;

detecting whether there is an external power supply;

receiving a working state of the in-vehicle detection system, wherein the working state includes a scanning state, a standby state or a stopped state;

acquiring a power consumption per unit time in each working state of the in-vehicle detection system;

acquiring a workload state of the in-vehicle detection system, wherein the workload state is determined based on a proportion of working periods of the in-vehicle detection system in each of different working states;

predicting whether the remaining electric quantity of the battery pack satisfies the working requirement of the in-vehicle detection system according to the electric quantity state information, the working state, the workload state and the power consumption per unit time in each working state of the in-vehicle detection system;

sending a start instruction to the low-power generator to charge the battery pack if the remaining electric quantity of the battery pack does not satisfy the working requirement of the in-vehicle detection system and the external power supply is not detected;

controlling the external power supply to charge the battery pack if the remaining electric quantity of the battery pack does not satisfy the working requirement of the in-vehicle detection system and the external power supply is detected; and sending a stop instruction to the low-power generator if the remaining electric quantity of the battery pack satisfies the working requirement of the in-vehicle detection system.

10. The control method according to claim 9, further comprising:

receiving configuration parameters and a current time;

predicting an average power consumption per unit time during a future period of time according to the workload state and the power consumption per unit time in each working state of the in-vehicle detection system; and predicting whether the remaining electric quantity of the battery pack satisfies the working requirement of the in-vehicle detection system according to the configuration parameters, the current time, the working state, the predicted average power consumption per unit time and the remaining electric quantity of the battery pack.

11. A control method of a power supply system for an in-vehicle detection system, comprising:

receiving electric quantity state information sent by a battery pack;

detecting whether there is an external power supply;

receiving a working state of the in-vehicle detection system, wherein the working state includes a scanning state, a standby state or a stopped state;

determining whether the remaining electric quantity of the battery pack satisfies the working requirement of the in-vehicle detection system according to the electric quantity state information and the working state, and whether an accelerator starts to emit rays;

sending a stop instruction to the low-power generator if the remaining electric quantity of the battery pack satisfies the working requirement of the in-vehicle detection system and the accelerator starts to emit rays, and sending a start instruction to the low-power generator if the accelerator finishes emitting rays;

sending a start instruction to the low-power generator to charge the battery pack if the remaining electric quantity of the battery pack does not satisfy the working requirement of the in-vehicle detection system and the external power supply is not detected; and controlling the external power supply to charge the battery pack if the remaining electric quantity of the battery pack does not satisfy the working requirement of the in-vehicle detection system and the external power supply is detected.

12. A power supply system for an in-vehicle detection system, comprising:

a low-power generator;

a battery pack for supplying power to the in-vehicle detection system;

a charger electrically connected to the low-power generator and the battery pack, respectively; and a power supply controller electrically connected to the battery pack and the low-power generator, respectively, and configured to:

receive electric quantity state information sent by the battery pack, detect whether there is an external power supply, receive a working state of the in-vehicle detection system, wherein the working state includes a scanning state, a standby state or a stopped state, determine whether the remaining electric quantity of the battery pack satisfies the working requirement of the in-vehicle detection system according to the electric quantity state information and the working state, and whether an accelerator starts to emit rays, send a stop instruction to the low-power generator if the remaining electric quantity of the battery pack satisfies the working requirement of the in-vehicle detection system and the accelerator starts to emit rays, and send a start instruction to the low-power generator if the accelerator finishes emitting rays, send a start instruction to the low-power generator to charge the battery pack if the remaining electric quantity of the battery pack does not satisfy the working requirement of the in-vehicle detection system and the external power supply is not detected, and controlling the external power supply to chare the battery pack if the remaining electric quantity of the battery pack does not satisfy the working requirement of the in-vehicle detection system and the external power supply is detected.

13. The power supply system according to claim 12, further comprising:

a power supply selector electrically connected to the charger, the power supply controller and the low-power generator, respectively, for making a selection between the external power supply and the low-power generator; or a second charger electrically connected to the battery pack, for charging the battery pack from an external power supply.

14. The power supply system according to claim 12, wherein the battery pack is a lithium battery pack, and the lithium battery pack comprises:

at least one battery set formed of a plurality of lithium battery cells connected in series or in parallel; and a battery management system for monitoring an electric quantity state of the battery set and sending electric quantity state information to the power supply controller.

15. The power supply system according to claim 14, further comprising:

at least one of a DC-DC converter or a DC-AC converter, wherein the DC-DC converter is electrically connected to the lithium battery pack and is used for converting a high voltage DC output from the lithium battery pack into a low voltage DC, and the DC-AC converter is electrically connected to the lithium battery pack, and is used for converting a high voltage DC output from the lithium battery pack into a power frequency AC.

16. The power supply system according to claim 12, wherein the battery pack is further used for receiving electric energy fed back by the in-vehicle detection system.

17. An in-vehicle detection system, comprising the power supply system according to claim 12.

18. The in-vehicle detection system according to claim 17, further comprising:

a main controller for sending a control instruction to the power supply controller of the power supply system to make the power supply controller charges the battery pack according to the control instruction.

* * * * *